(No Model.)
J. M. KIMBALL.
DUMPING WAGON.
No. 451,825.  Patented May 5, 1891.
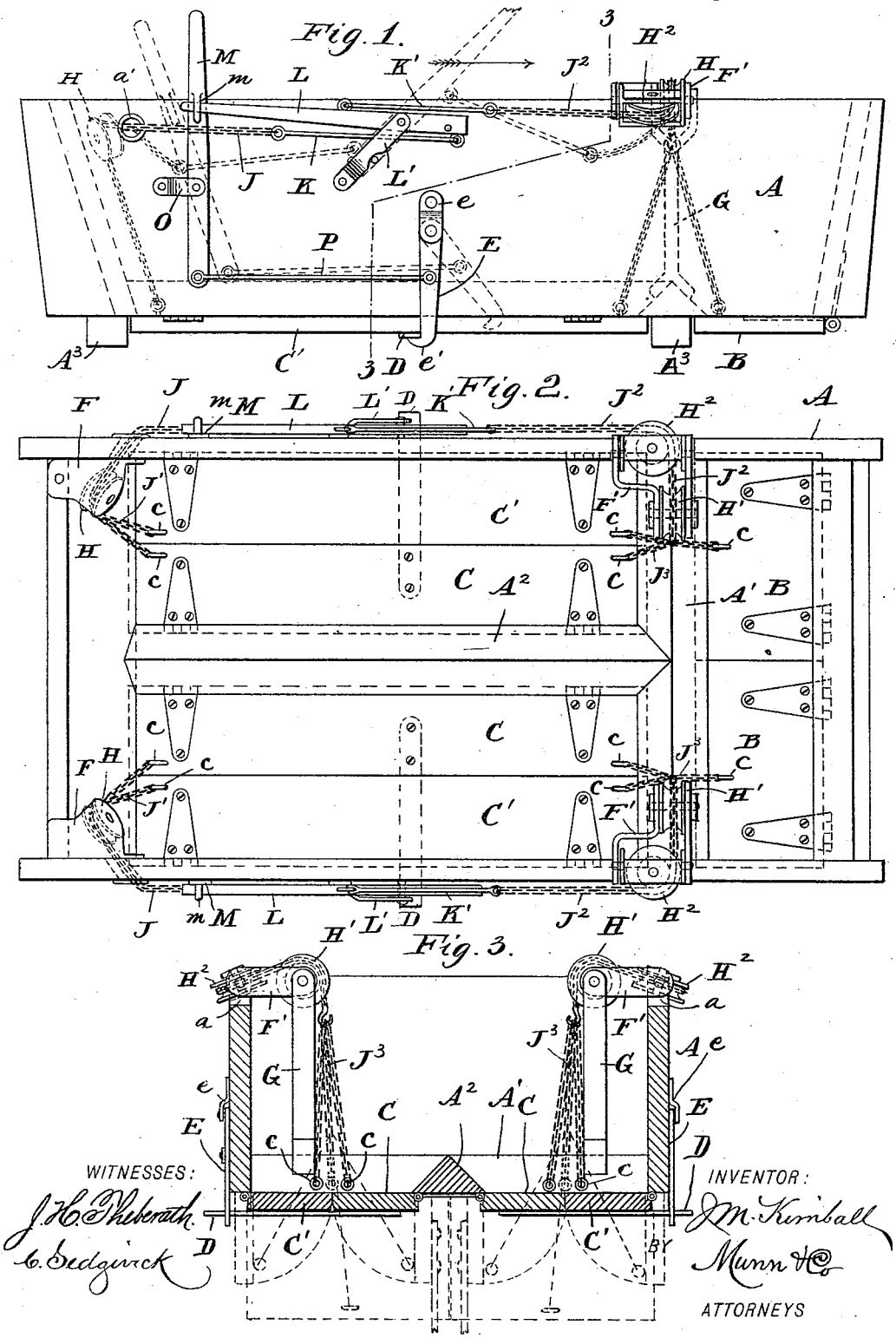

UNITED STATES PATENT OFFICE.

JAMES M. KIMBALL, OF WOODSTOCK, ILLINOIS.

DUMPING-WAGON.

SPECIFICATION forming part of Letters Patent No. 451,825, dated May 5, 1891.

Application filed February 11, 1891. Serial No. 381,014. (No model.)

*To all whom it may concern:*

Be it known that I, JAMES M. KIMBALL, of Woodstock, in the county of McHenry and State of Illinois, have invented a new and Improved Dumping-Wagon Box, of which the following is a full, clear, and exact description.

My invention relates to improvements in dumping-wagon boxes; and the object of my invention is to produce a wagon-box which may be carried on any ordinary running-gear, which may be used as a common wagon-box, and which is provided with means for dropping the load through the bottom and for simultaneously closing and locking the bottom leaves.

To this end my invention consists in a wagon-box having a series of vertically-swinging leaves hinged in the bottom and a lever mechanism for operating the leaves. This construction will be hereinafter fully described, and then pointed out in the claims.

Reference is to be had to the accompanying drawings, forming a part of this specification, in which similar letters of reference indicate corresponding parts in all the figures.

Figure 1 is a side elevation of a wagon-body embodying my invention. Fig. 2 is a plan view of the same, and Fig. 3 is a vertical cross-section on the line 3 3 in Fig. 1.

The wagon-box A is shaped to rest upon any ordinary running-gear, is provided near one end with a cross-beam A', which extends across the bottom, with a center-beam A², which extends from the cross-beam to the front end of the wagon, the center and cross beams being beveled to an edge on their upper sides, so as not to impede the passage of dirt or other material through the bottom, and with thick cross-pieces A³, which extend across the bottom, and which are adapted to rest upon the bolsters of a running-gear, so as to elevate the box and enable the leaves to open and close over the hounds of the wagon.

The wagon-box is provided with leaves B, C, and C', which form the bottom of the box. The leaves B are hinged to the rear end of the box and swing upward against the cross-beam A'. The leaves C extend lengthwise of the box and are hinged to the under side of the center beam A, and the leaves C' extend parallel with the leaves C and are hinged to the under side of the box, so that when the leaves C and C' are closed upward the edges will meet, thus forming a tight bottom to the box. The leaves C are provided with cross-pieces D, which are centrally secured thereto, and which are long enough to reach beyond the sides of the wagon-box when the leaves are closed, and the cross-pieces will thus press against the bottoms of the leaves C' and hold the same in a horizontal position.

The cross-pieces D and the leaves connected therewith are held in an elevated position by means of the arms E, which are pivoted in ears $e$ on opposite sides of the wagon-box, and which have their lower ends formed into catches $e'$, which close under the cross-pieces D, and thus prevent them from dropping. The arms E are adapted to swing backward and forward, and they are operated by a lever mechanism which will be hereinafter described.

In the front upper corners of the wagon-box are brackets F, and on opposite sides of the box and above the cross-beam A' are brackets F', the brackets F and F' being adapted to hold guide-pulleys H, H', and H². The inner ends of the brackets F' are supported by uprights G, which are secured to the inner ends of the brackets, and which extend downward to rest upon the cross-beam A'. The guide-pulleys H are pivoted in the front brackets F, so as to turn vertically, the pulleys H' are pivoted in the inner ends of the brackets F', so as to turn vertically, and the pulleys H² are pivoted horizontally in the outer portions of the brackets F', and turn in recesses $a$ in the upper edges of the wagon-box.

The bottom leaves of the wagon-box are all provided with rings or staples $c$, the staples being arranged near the front edges of the leaves B and at each end of the leaves C and C', and the rings at the front ends of the leaves C and C' are connected by branch chains J' with chains J, which chains extend over the guide-pulleys H and outward through openings $a'$ in the upper part and on each side of the wagon-box. Each chain J connects by means of a rod K with a lever L, which is pivoted in a keeper L' on the side of the box, and the lever L is connected on the rear side by a rod K' with a chain J², which chain extends inward over the pulleys H² and H' and is hooked to the branch chains J³, which chains extend downward and are secured to the leaves B, C, and C'. The rod K is secured to the lever L below the point at which the lever is pivoted, and the rod K' is secured to the lever above the point at which it is pivoted, so that when the lever is operated the rods K and K' will be simultaneously operated, thus opening or closing the leaves at both ends of the wagon-box at the same time.

Pivoted on each side of the wagon, near the front end, in a keeper O, is a lever M, which has on its outer side a keeper m, which is open at the bottom and is adapted to hold the end of the lever L downward, as shown in Fig. 1, and the lower end of the lever M is connected by a rod P with the arm E, the rod P being secured to the arm at a point below the pivot of the arm, and it will be seen that by moving the lever M backward or forward the arm E may be correspondingly moved, so as to make it engage with the cross-piece D or free it from engagement with the cross-piece.

The wagon-body is operated as follows: We will suppose that it is filled and that the material is to be dumped, the parts being all locked in place, as shown in Fig. 1. The driver pulls the upper ends of the levers M forward, thus freeing the ends of the levers L from the keepers m and loosening the supporting-chains of the leaves B, C, and C', so that the leaves may drop freely, and the movement of the levers M also pushes the arms E rearward and from beneath the cross pieces D, so that the weight of the material in the body forces all of the leaves downward, as indicated by dotted lines in Fig. 3, and the load is dropped to the ground. The driver then pulls the levers L downward, as shown in Fig. 1, thus actuating the rods K and K' and raising the leaves in the box-bottom, and he then swings the levers M backward, causing the keepers m to engage the levers L and hold them and the bottom leaves C in place, and at the same time the rods P pull the arms E forward beneath the cross-pieces D, thus supporting the bottom leaves. It will thus be seen that the load may be quickly dumped and that the bottom leaves may be as quickly closed and secured.

When the wagon body or box is used for carrying material which cannot be dumped—such, for instance, as lumber—the levers which project above the sides of the wagon-box will form substantial stakes, which will prevent the displacement of the load.

Having thus described my invention, I claim as new and desire to secure by Letters Patent—

1. A wagon-box having in its bottom a cross-beam and center beam, leaves hinged to one end of the box so as to close against the cross-beam, parallel leaves hinged to the center beam and to the sides of the wagon-box, and a lever mechanism for simultaneously raising all the leaves, substantially as described.

2. A wagon-box having in the bottom a cross-beam and center beam, leaves hinged to one end of the wagon-box so as to close against the cross-beam, parallel leaves hinged to the center beam and to the sides of the box, chains secured to the various leaves and connecting with the main chains, which extend over suitable guide-pulleys and out through the sides of the box, and a lever mechanism for operating the chains, substantially as described.

3. In a wagon-box having a center beam therein, the combination of the center leaves hinged to the center beam, the parallel leaves hinged to the box-sides, a cross-piece secured to the center leaves and adapted to close against the outer leaves, and a catch or support for the cross-pieces, substantially as described.

4. In a wagon-box having a center beam therein, the combination, with the leaves hinged to the sides of the box and the parallel leaves hinged to the center beam, of cross-pieces secured to the center leaves and adapted to close over the outer leaves, arms pivoted on the sides of the box and having their ends adapted to close under the cross-pieces, and a lever mechanism for moving the arms, substantially as described.

5. In a wagon-box, the combination, with the bottom leaves, the chains connected therewith, and the levers for operating the chains, of cross-pieces secured to the longitudinal leaves and extending beyond the sides of the wagon-box, arms pivoted on the wagon-box and adapted to support the cross-pieces, and levers pivoted on the wagon-box, said levers having a rod connection with the arms and having keepers thereon to hold the chain-operating levers, substantially as described.

JAMES M. KIMBALL.

Witnesses:
ALICE M. KIMBALL,
TENNIE D. HYDE.